June 21, 1927.
L. SAIVES
VALVE TAPPET
Filed Feb. 25, 1927
1,633,038
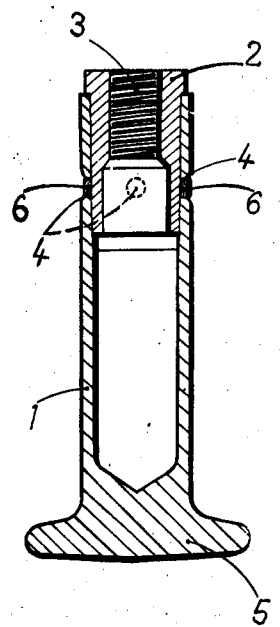

Patented June 21, 1927.

1,633,038

UNITED STATES PATENT OFFICE.

LÉON SAIVES, OF BILLANCOURT, FRANCE, ASSIGNOR TO LOUIS RENAULT, OF BILLANCOURT, FRANCE.

VALVE TAPPET.

Application filed February 25, 1927, Serial No. 170,953, and in France November 17, 1926.

My invention relates to tappets for the control of the valves of internal combustion engines, and has chiefly for its object certain improvements in the manufacture of said tappets in the case in which they consist of two different metals. These improvements consist in securing to the upper part of the tappet, whose stem is hollow, a tapped socket consisting of a different metal from the one employed for the main part of the tappet, said socket being adapted for the insertion of the regulating screw; the socket is attached to the rod by electric welding which is performed at different points on the device. If the welding tool were applied directly upon the surface of the stem of the tappet, the parts could not be properly attached, since the tubular portion of the tappet would be melted before the welding could take place. I obviate this defect by the use of a certain number of small discs of the metal employed for the socket, these being inserted into apertures formed in the tubular part. The electric welding tool is applied to the said discs, and the parts will thus be welded together in an approved manner.

The appended drawing shows an axial section of a valve tappet in accordance with the invention.

With reference to this drawing, it is observed that the tappet comprises a tubular part 1 which is formed in one with the base 5 consisting of a hard metal such as cast iron. Upon the open end of the tubular part is mounted a socket which consists of a different metal from the one used in the construction of the main part of the tappet, for instance a steel socket which is tapped at 3 for the insertion of the screw for adjusting the valve (not shown). The socket 2 is secured to the tubular part 1 of the tappet by the electric welding process, and to perform this operation properly the said tubular part is apertured in suitable places at 4 and in the apertures are placed the small discs 6 consisting of the metal of which the socket 2 is made, for instance steel. To weld the metal, the electrodes are applied to the said discs, and the device is thus secured together in an approved manner; the discs become melted, and adhere to the tubular part 1 and also to the socket 2.

In this manner I obviate the damage to the tubular part which would be produced if the electric welding were performed by applying the welding tool at different points upon the surface of the tubular part. By this method of manufacture, the two parts of the tappet are held together in an approved manner, and the device may be of light weight and may consist of metals which are the best adapted for the purpose.

Claim—

A valve tappet comprising a tubular stem, a base at the under part of and in a single piece with the stem, a threaded socket mounted in the upper part of the stem and of a different metal from that of the stem and base, apertures in the tubular stem, and discs of the same metal as that of the socket placed in the apertures and providing for the fixing of the socket in the tubular stem by electric welding.

In testimony whereof I affix my signature.

LÉON SAIVES.